(12) United States Patent
Natarajan et al.

(10) Patent No.: US 12,551,947 B2
(45) Date of Patent: Feb. 17, 2026

(54) BINDER SOLUTIONS COMPRISING A FUGITIVE METAL PRECURSOR FOR USE IN ADDITIVE MANUFACTURING

(71) Applicant: General Electric Company, Schenectady, NY (US)

(72) Inventors: Arunkumar Natarajan, Mason, OH (US); Kwok Pong Chan, Niskayuna, NY (US); William C. Alberts, Saratoga Springs, NY (US); Xi Yang, Mason, OH (US); Mary Kathryn Thompson, Fairfield, OH (US)

(73) Assignee: General Electric Company, Evendale, OH (US)

( * ) Notice: Subject to any disclaimer, the term of this patent is extended or adjusted under 35 U.S.C. 154(b) by 338 days.

(21) Appl. No.: 17/325,332

(22) Filed: May 20, 2021

(65) Prior Publication Data

US 2021/0370547 A1    Dec. 2, 2021

Related U.S. Application Data

(60) Provisional application No. 63/029,957, filed on May 26, 2020.

(51) Int. Cl.
*B22F 10/14* (2021.01)
*B22F 1/107* (2022.01)
(Continued)

(52) U.S. Cl.
CPC .............. *B22F 10/14* (2021.01); *B22F 1/107* (2022.01); *B28B 1/001* (2013.01); *B33Y 10/00* (2014.12);
(Continued)

(58) Field of Classification Search
CPC ......... B28B 1/001; B22F 10/14; B33Y 10/00; B33Y 70/00; B33Y 80/00; C04B 35/6303;
(Continued)

(56) References Cited

U.S. PATENT DOCUMENTS

| 4,543,373 A | 9/1985 | Krawiec et al. |
| 7,744,205 B2 | 6/2010 | Sarkisian et al. |

(Continued)

FOREIGN PATENT DOCUMENTS

| EP | 1039980 B1 | 11/2004 |
| EP | 3069801 A2 | 9/2016 |

(Continued)

OTHER PUBLICATIONS

European Extended Search Report for EP Application No. 21173603.8, 9pgs, Oct. 11, 2021.

(Continued)

*Primary Examiner* — Sally A Merkling
*Assistant Examiner* — Nazmun Nahar Shams
(74) *Attorney, Agent, or Firm* — Dinsmore & Shohl LLP

(57) ABSTRACT

A binder solution comprises a fugitive metal precursor, a thermoplastic binder, and a solvent. The fugitive metal precursor may comprise an alkaline earth metal, a transition metal, a post-transition metal, a metalloid, a rare earth metal, or combinations thereof. The fugitive metal precursor may comprise a salt such as carboxylate, nitrate, sulfate, carbonate, formate, chloride, halide, derivatives thereof, and combinations thereof. A method of manufacturing a part includes depositing a layer of particulate material on a working surface, selectively applying a binder solution into the layer of particulate material in a pattern representative of a layer of the part, repeating the steps of depositing and selectively applying to form a plurality of layers of particulate material (Continued)

with the applied binder solution, and curing the applied binder solution in the plurality of layers of particulate material with the applied binder solution to evaporate the solvent and form a green body part.

6 Claims, 8 Drawing Sheets

(51) Int. Cl.
| | |
|---|---|
| *B28B 1/00* | (2006.01) |
| *B33Y 10/00* | (2015.01) |
| *B33Y 70/00* | (2020.01) |
| *B33Y 80/00* | (2015.01) |
| *C04B 35/63* | (2006.01) |
| *C04B 35/634* | (2006.01) |

(52) U.S. Cl.
CPC .............. *B33Y 70/00* (2014.12); *B33Y 80/00* (2014.12); *C04B 35/6303* (2013.01); *C04B 35/63416* (2013.01); *C04B 35/63424* (2013.01); *C04B 35/63444* (2013.01); *C04B 35/63464* (2013.01); *C04B 35/63468* (2013.01); *C04B 2235/60* (2013.01)

(58) Field of Classification Search
CPC ........ C04B 35/63416; C04B 35/63424; C04B 35/63444; C04B 35/63464; C04B 35/63468; C04B 2235/60
See application file for complete search history.

(56) References Cited

U.S. PATENT DOCUMENTS

| | | |
|---|---|---|
| 9,770,867 B2 | 9/2017 | Mogele et al. |
| 9,908,819 B1 | 3/2018 | Kollenberg |
| 10,272,592 B2 | 4/2019 | Demuth et al. |
| 2003/0180451 A1* | 9/2003 | Kodas ................... H01B 1/026 |
| | | 427/376.6 |
| 2009/0007724 A1 | 1/2009 | Liu |
| 2017/0297100 A1 | 10/2017 | Gibson et al. |
| 2017/0297106 A1 | 10/2017 | Myerberg et al. |
| 2019/0054527 A1* | 2/2019 | Natarajan ............. B33Y 80/00 |
| 2019/0248932 A1 | 8/2019 | Korshikov et al. |
| 2021/0283690 A1* | 9/2021 | Nauka ................... B29C 64/264 |

FOREIGN PATENT DOCUMENTS

| | | | |
|---|---|---|---|
| JP | 2001517732 A | 10/2001 | |
| JP | 2016500645 A | 1/2016 | |
| JP | 2016175212 A | 10/2016 | |
| WO | WO-9915293 A1 * | 4/1999 | ........... B22F 1/0059 |
| WO | 2019025801 A1 | 2/2019 | |
| WO | 2019236100 A1 | 12/2019 | |

OTHER PUBLICATIONS

Lores, "A Review on Recent Developments in Binder Jetting Metal Additive Manufacturing: Materials and Process Characteristics", Powder Metallurgy, Taylor & Francis, Sep. 24, 2019.

Bai, Yun, and Christopher B. Williams. "Binder jetting additive manufacturing with a particle-free metal ink as a binder precursor." Materials & Design 147 (2018): 146-156.

Japanese Patent Office Action for Application No. 2021-083981 dated Nov. 8, 2022 (10 pages.).

* cited by examiner

BINDER SOLUTIONS COMPRISING A FUGITIVE METAL PRECURSOR FOR USE IN ADDITIVE MANUFACTURING

CROSS-REFERENCE TO RELATED APPLICATIONS

The present specification claims the benefit of U.S. Provisional Application Ser. No. 63/029,957 filed May 26, 2020 and entitled "Binder Solutions Comprising a Fugitive Metal Precursor For Use In Additive Manufacturing," the entirety of which is incorporated by reference herein.

FIELD

The present specification relates to additive manufacturing. More specifically, the present specification is directed to binder solutions comprising a fugitive metal precursor for use in additive manufacturing.

TECHNICAL BACKGROUND

Additive manufacturing, also known as 3D printing, is a process in which material is built up layer-by-layer to form an object. Binder jetting is an additive manufacturing technique based on the use of a binder to join particles of a powder to form a three-dimensional object. In particular, the binder is jetted onto successive layers of the powder in a build volume, where layers of the powder and the binder adhere to one another to form a three-dimensional object. In some applications, the printed part is suitable for end-use.

In other applications, subsequent processing, such as removal of the binder and sintering of the powder, may be needed to transform the printed three-dimensional part into a finished part. Accordingly, it is desirable for the printed part to have a suitable green strength for handling (e.g., transferring, inspecting, depowdering) and suitable brown strength for minimizing distortion during the debinding/sintering processes. However, binder solutions previously available for binder jet 3D printing do not provide the brown strength necessary to prevent distortion and damage to the printed part during the post-printing processes.

Accordingly, a need exists for alternative binder solutions that maintain green strength and provide improved brown strength to the printed part during post-printing processes.

SUMMARY

Various embodiments of binder solutions disclosed herein meet these needs by including a fugitive metal precursor that fills the voids and provides contact and bridging between the particles of the powder layer prior to sintering of the particulate material, thereby improving the brown strength and overall stiffness of the printed part. Increasing the density of the article decreases the shrinkage and increases the strength of the printed part, which reduces cracking and distortion.

According to a first aspect A1, a binder solution may include: greater than or equal to 0.5 wt % and less than or equal to 40 wt % of a fugitive metal precursor, based on a total weight of the binder solution; a thermoplastic binder comprising one or more thermoplastic polymer strands; and a solvent, wherein the fugitive metal precursor and the thermoplastic binder are dissolved in the solvent.

A second aspect A2 includes the binder solution according to the first aspect A1, wherein the binder solution comprises greater than or equal to 1 wt % and less than or equal to 20 wt % of the fugitive metal precursor, based on a total weight of the binder solution.

A third aspect A3 includes the binder solution according to the first aspect A1 or the second aspect A2, wherein the fugitive metal precursor is selected from the group consisting of an alkaline earth metal, a transition metal, a post-transition metal, a metalloid, a rare earth metal, and combinations thereof.

A fourth aspect A4 includes the binder solution according to any of the first through third aspects A1-A3, wherein the fugitive metal precursor comprises an organometallic compound, the organometallic compound comprising ferrocene, cobaltocene, iron pentacarbonyl, or a combination thereof.

A fifth aspect A5 includes the binder solution according to any of the first through fourth aspects A1-A4, wherein the fugitive metal precursor comprises a salt, the salt comprising a compound selected from the group consisting of carboxylates, nitrates, sulfates, carbonates, formates, chlorides, halides, a derivative thereof, and combinations thereof.

A sixth aspect A6 includes the binder solution according to the fifth aspect A5, wherein the salt comprises nickel chloride, iron chloride, nickel formate, copper chloride, silver nitrate, nickel nitrate, copper nitrate, aluminum nitrate, magnesium chloride, barium nitrate, barium chloride, titanium nitrate, or a combination thereof.

A seventh aspect A7 includes the binder solution according to any of the first through sixth aspects A1-A6, wherein each of the one or more thermoplastic polymer strands has an average molecular weight greater than or equal to 1000 g/mol and less than or equal to 50,000 g/mol.

An eighth aspect A8 includes the binder solution according to any of the first through seventh aspects A1-A7, wherein each of the one or more thermoplastic polymer strands is selected from the group consisting of polyvinyl alcohol (PVA), polyamides, polyacryl amide (PAAm), polymethylmethacrylate (PMMA), polyvinyl carbonate, derivatives thereof, and combinations thereof.

A ninth aspect A9 includes the binder solution according to any of the first through eighth aspects A1-A8, wherein a viscosity of the binder solution is greater than or equal to 1 cP and less than or equal to 40 cP.

According to a tenth aspect A10, a method of manufacturing a part may include: depositing a layer of particulate material on a working surface; selectively applying a binder solution into the layer of particulate material in a pattern representative of a layer of the part, the binder solution comprising: greater than or equal to 0.5 wt % and less than or equal to 40 wt % of a fugitive metal precursor, based on a total weight of the binder solution; a thermoplastic binder comprising one or more thermoplastic polymer strands; and a solvent, wherein the fugitive metal precursor and the thermoplastic binder are dissolved in the solvent; repeating the steps of depositing and selectively applying to form a plurality of layers of particulate material with the applied binder solution; and curing the applied binder solution in the plurality of layers of particulate material with the applied binder solution to evaporate the solvent and thereby form a green body part.

An eleventh aspect A11 includes the method according to the tenth aspect A10, wherein curing the applied binder solution comprises heating the plurality of layers of particulate material with the applied binder solution at a temperature greater than or equal to 40° C. and less than or equal to 80° C.

A twelfth aspect A12 includes the method according to the tenth aspect A10 or the eleventh aspect A11, wherein the fugitive metal precursor comprises a salt selected from the group consisting of carboxylates, nitrates, sulfates, carbonates, formates, chlorides, halides, derivatives thereof, and combinations thereof.

A thirteenth aspect A13 includes the method according to any of the tenth through twelfth aspects A10-A12, wherein the particulate material comprises a metal particulate material, the metal particulate material comprising a nickel alloy, a cobalt alloy, a cobalt-chromium alloy, a titanium alloy, an aluminum-based material, a tungsten alloy, a stainless steel alloy, or a combination thereof.

A fourteenth aspect A14 includes the method according to the thirteenth aspect A13, wherein the method further comprises: heating the green body part above a first temperature in an oxygen-free environment to remove at least a portion of the thermoplastic binder and sinter at least a portion of the fugitive metal precursor such that the sintered fugitive metal precursor forms necked regions of metallic material between the particulate material thereby forming a brown body part; and heating the brown body part above a second temperature to sinter the particulate material thereby forming a consolidated part.

A fifteenth aspect A15 includes the method according to any of the tenth through twelfth aspects A10-A12, wherein the particulate material comprises a ceramic particulate material, the ceramic particulate material comprising alumina, aluminum nitride, zirconia, titania, silica, silicon nitride, silicon carbide, boron nitride, or a combination thereof.

According to a sixteenth aspect A16, a green body part may include: a plurality of layers of particulate material; greater than or equal to 0.5 wt % and less than or equal to 5 wt % of a fugitive metal precursor, based on a total weight of the green body part; and greater than or equal to 0.5 wt % and less than or equal to 3 wt % of a thermoplastic binder, based on a total weight of the green body part, the thermoplastic binder comprising one or more thermoplastic polymer strands, wherein the thermoplastic binder bonds the particulate material of the plurality of layers of particulate material, and wherein the green body part comprises a three-point flexural strength greater than or equal to 1.0 kPa as measured in accordance with ASTM B312-14.

A seventeenth aspect A17 includes the green body part according to the sixteenth aspect A16, wherein the fugitive metal precursor comprises a salt selected from the group consisting of carboxylates, nitrates, sulfates, carbonates, formates, chlorides, halides, derivatives thereof, and combinations thereof.

An eighteenth aspect A18 includes the green body part according to the sixteenth aspect A16 or seventeenth aspect A17, wherein the particulate material comprises a metal particulate material, the metal particulate material comprising a nickel alloy, a cobalt alloy, a cobalt-chromium alloy, a titanium alloy, an aluminum-based material, a tungsten alloy, a stainless steel alloy, or a combination thereof.

A nineteenth aspect A19 includes the green body part according to the sixteenth aspect A16 or the seventeenth aspect A17, wherein the particulate material comprises a ceramic particulate material, the ceramic particulate material comprising alumina, aluminum nitride, zirconia, titania, silica, silicon nitride, silicon carbide, boron nitride, or a combination thereof.

A twentieth aspect A20 includes the green body part according to any of the sixteenth through nineteenth aspects A16-A19, wherein each of the one or more thermoplastic polymer strands is selected from the group consisting of polyvinyl alcohol (PVA), polyamides, polyacryl amide (PAAm), polymethylmethacrylate (PMMA), polyvinyl carbonate, derivatives thereof, and combinations thereof.

Additional features and advantages of the embodiments disclosed herein will be set forth in the detailed description, which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
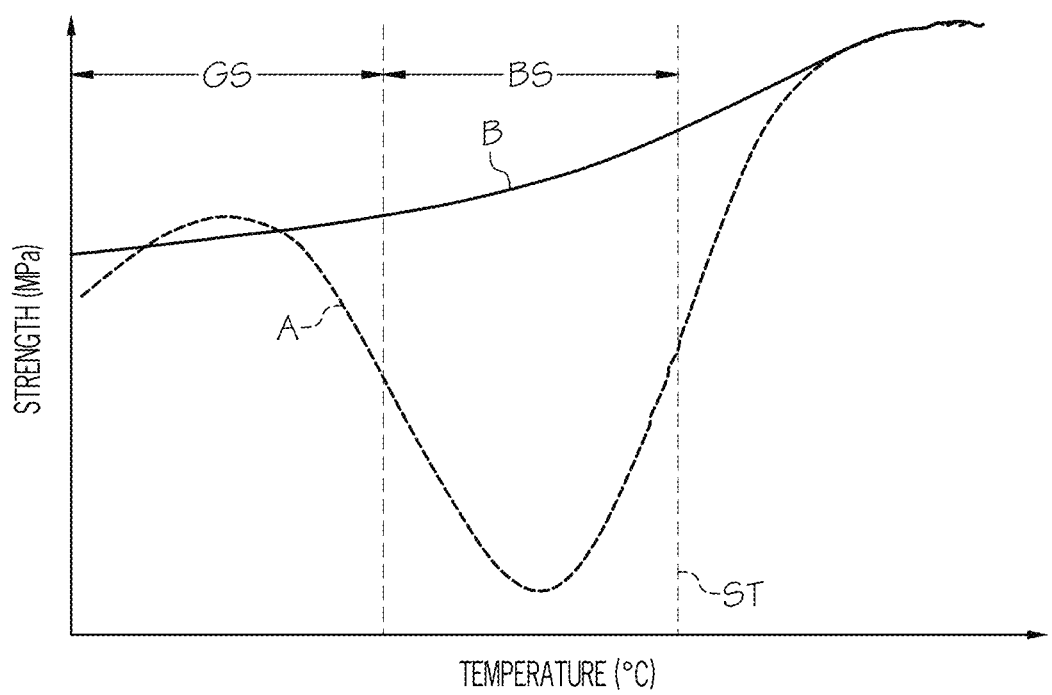
FIG. 1 is a plot showing strength vs. temperature curves of a part formed using a conventional binder solution and a part formed using an example binder solution comprising a fugitive metal precursor according to one or more embodiments described herein.

Reference will now be made in detail to various embodiments of fugitive metal precursor binder solutions for use in additive manufacturing.

In particular, various embodiments of fugitive metal precursor binder solutions comprise greater than or equal to 0.5 wt % and less than or equal to 40 wt % of a fugitive metal precursor, based on a total weight of the binder solution, a thermoplastic binder, and a solvent. Various embodiments of binder solutions comprising a fugitive metal precursor and use of such binder solutions in additive manufacturing will be referred to herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The phrase "fugitive metal precursor," as used herein, refers to a metal salt or organometallic compound that is decomposed during debinding and/or sintering, which results in metal, metal oxide, metal carbide, or metal nitride formation and the burning out of the organic and inorganic functionalities of the metal salt or organometallic compound.

The phrase "thermoplastic binder," as used herein, refers to a binder that includes one or more thermoplastic polymer strands having functional groups that may interact with one another via weak non-covalent forces (e.g., interactions, bonds) to link, or otherwise couple, strands of each respective thermoplastic polymer to one another.

The phrase "weak non-covalent forces," as used herein, refers to hydrogen bonding, ionic bonding, Van der Waals forces, and the like having a bond or force strength greater than or equal to 1 kcal/mol and less than or equal to 7 kcal/mol.

The phrases "standard temperature and pressure" and "STP," as used herein, refer to a temperature of 0° C. and pressure of 101.325 kPa.

The term "jettability," as used herein, refers to the ability of a binder solution to be jetted, such as from a printhead. A binder solution may be considered to be "jettable" when all the polymers and additives are solubilized in the binder solution and the binder solution has a viscosity of 1-40 centipoise (cP).

The parameter "viscosity" of the binder solution, as discussed herein, is measured using a rheometer in accordance with ASTM E3116.

The term "debinding," as used herein, refers to heating the green body part above a first temperature such that thermolysis of the thermoplastic binder into small oligomers occurs and at least a portion of the thermoplastic binder is removed, thereby forming a brown body part The term "sintering," as used herein, refers to heating the brown body part above a second temperature to remove a remaining portion of the thermoplastic binder (e.g., oligomeric residues and thermolytic byproducts formed during debinding) and consolidate the particles of the powder layer thereby forming a consolidated part.

The term "decompose," as used herein, refers to the reduction of the fugitive metal precursor during debinding and/or sintering to only metal and the burning out of the organic and inorganic functionalities of the fugitive metal precursor.

The term "necked region," as used herein, refers to local deformation of the metallic material between adjacent particles of the particulate material.

The phrase "green body part," as used herein, refers to a printed part that has not undergone heat treatment to remove the thermoplastic binder.

The phrase "brown body part," as used herein, refers to a printed part that has undergone a debind heat treatment to remove at least a portion of the thermoplastic binder.

The parameters "green body strength" and "brown body strength" of the parts, as discussed herein, are measured using a three-point flexural strength test in accordance with ASTM B312-14.

In additive manufacturing processes including binder jetting, a binder solution is jetted from a printhead onto successive layers of a powder to join particles of a powder to form a printed three-dimensional part. As discussed hereinabove, in embodiments, subsequent processing (e.g., debinding and sintering) may be needed to transform the printed three-dimensional part into a consolidated part. Accordingly, it is desirable for the printed part to have a suitable green strength for handling (e.g., transferring, inspecting, depowdering) and suitable brown strength for minimizing distortion during the post-printing processes. This reduces the occurrence of warping or part failure prior to consolidation, thereby improving manufacturing throughput.

However, conventional binder solutions including thermoplastic binders typically do not provide the brown strength necessary to prevent distortion and damage to the printed part during the post-printing processes. Specifically, the strength of a green body part is provided by the binder solution along with some contribution from particle friction and mechanical interlocking of the particles. The strength provided by the binder solution is due to weak non-covalent forces formed between the thermoplastic polymer strands (e.g., as with polymeric binders). As the green body part is heated to remove the thermoplastic binder and form a brown body part (i.e., prior to the particles sintering together), the mechanical strength (i.e., the brown strength) of the printed part is dependent on interparticle friction and mechanical interlocking, which is limited in the relatively large, approximately spherical particles commonly used to form the powder layer (e.g., metal particles). The low brown strength may lead to warping or even mechanical failure of the part.

Accordingly, various embodiments of binder solutions described herein include a fugitive metal precursor that fills the voids between the particles of the powder layer and provides contact and bridging between the particles of the powder layer prior to sintering of the particulate material, thereby improving the brown strength and overall stiffness of the printed part. Moreover, increasing the density of the article decreases the shrinkage and increases the strength of the printed part, which reduces cracking and distortion.

Referring now to FIG. 1, as shown by curve A, a part formed using a conventional binder solution including a thermoplastic binder exhibits insufficient brown strength BS after the green body part is heated to remove the thermoplastic binder and prior to sintering ST of the particulate material. In contrast, as shown by curve B, a part formed using a binder solution including a fugitive metal precursor in accordance with embodiments disclosed herein exhibits improved brown strength BS as the green strength GS decreases after the green body part is heated to remove the thermoplastic binder but prior to sintering ST the particulate material. The brown strength is achieved when debinding is conducted in a conducive atmosphere and the fugitive metal precursor decomposes to form reduced metal, resulting in improved overall stiffness of the brown body part. This improved stiffness imparts brown strength, which replaces the green strength after debinding. The decomposition of the fugitive metal precursors may occur in a wider range of temperatures, depending on the decomposition characteristics of the fugitive metal precursors.

As set forth above, the binder solutions described herein may comprise a fugitive metal precursor, a thermoplastic binder, and a solvent. The fugitive metal precursor, when provided in a binder solution, may decompose at the lower temperatures of the debinding step and bond the particulate material prior to sintering of the particulate material, thereby providing strength to the brown body part. The strength provided by the fugitive metal precursor allows for the formation of fine features in the consolidated part and/or the formation of large parts. For example, for a part including a cantilevered portion, such as an overhang, weak brown strength may lead to the cantilevered portion collapsing or cracking because the weight of the cantilevered portion is not sustained by interparticle friction that keeps the printed part together prior to sintering. However, fugitive metal precursors may decompose during the debinding step enabling in-situ metal formation, which provides stiffness and strength to the printed part after all the thermoplastic binder is burned out by contacting and bridging the particulate material prior to sintering of the particulate material, thereby improving the strength and stiffness of the printed part overall.

In embodiments, the fugitive metal precursor is selected from the group consisting of an alkaline earth metal (i.e., an element from Group II of the periodic table), a transition metal (i.e., an element from Groups III-XII of the periodic table), a post-transition metal (i.e., aluminum, gallium, indium, tin, thallium, lead, and bismuth), a metalloid (i.e., boron, silicon, germanium, arsenic, antimony, and tellurium), a rare earth metal (i.e., scandium, yttrium, and lanthanides), and combinations thereof. In embodiments, the fugitive metal precursor is an organometallic compound that is organic solvent soluble, such as, by way of example and not limitation, ferrocene, cobaltocene, iron pentacarbonyl, or combinations thereof. In embodiments, the fugitive metal precursor is a salt, such as a compound selected from the group consisting of carboxylates, nitrates, sulfates, carbonates, formates, chlorides, halides, derivatives thereof, and combinations thereof. Examples of suitable salts that are water/organic solvent soluble include, but way of example and not limitation, nickel chloride, iron chloride, nickel formate, copper chloride, silver nitrate, nickel nitrate, copper nitrate, nickel carbonate, silver carbonate, silver perchlorate, silver halide, nickel sulfate, nickel sulfamate, nickel oxalate dehydrate, ammonium molybdate tetrahydrate, aluminum nitrate, magnesium chloride, barium nitrate, barium chloride, titanium nitrate, and combinations thereof. Other fugitive metal precursors are contemplated. In embodiments, the fugitive metal precursor is fully soluble in the solvent at STP.

In embodiments, the binder solution includes greater than or equal to 0.5 wt % and less than or equal to 40 wt % of the fugitive metal precursor, based on a total weight of the binder solution. In embodiments, the amount of the fugitive metal precursor in the binder solution may be greater than or equal to 0.5 wt %, greater than or equal to 1 wt %, or even greater than or equal to 2 wt %. In embodiments, the amount of the fugitive metal precursor in the binder solution may be less than or equal to 40 wt %, less than or equal 30 wt %, less than or equal to 25 wt %, less than or equal to 20 wt %, less than or equal to 15 wt %, less than or equal to 12 wt %, less than or equal to 10 wt %, less than or equal to 8 wt %, or even less than or equal to 6 wt %. For example, the amount of the fugitive metal precursor in the binder solution may be greater than or equal to 0.5 wt % and less than or equal to 40 wt %, greater than or equal to 0.5 wt % and less than or equal to 30 wt %, greater than or equal to 0.5 wt % and less than or equal to 25 wt %, greater than or equal to 0.5 wt % and less than or equal to 20 wt %, greater than or equal to 0.5 wt % and less than or equal to 15 wt %, greater than or equal to 0.5 wt % and less than or equal to 12 wt %, greater than or equal to 0.5 wt % and less than or equal to 10 wt %, greater than or equal to 0.5 wt % and less than or equal to 8 wt %, greater than or equal to 0.5 wt % and less than or equal to 6 wt %, greater than or equal to 1 wt % and less than or equal to 40 wt %, greater than or equal to 1 wt % and less than or equal to 30 wt %, greater than or equal to 1 wt % and less than or equal to 25 wt %, greater than or equal to 1 wt % and less than or equal to 20 wt %, greater than or equal to 1 wt % and less than or equal to 15 wt %, greater than or equal to 1 wt % and less than or equal to 12 wt %, greater than or equal to 1 wt % and less than or equal to 10 wt %, greater than or equal to 1 wt % and less than or equal to 8 wt %, greater than or equal to 1 wt % and less than or equal to 6 wt %, greater than or equal to 2 wt % and less than or equal to 40 wt %, greater than or equal to 2 wt % and less than or equal to 30 wt %, greater than or equal to 2 wt % and less than or equal to 25 wt %, greater than or equal to 2 wt % and less than or equal to 20 wt %, greater than or equal to 2 wt % and less than or equal to 15 wt %, greater than or equal to 2 wt % and less than or equal to 12 wt %, greater than or equal to 2 wt % and less than or equal to 10 wt %, greater than or equal to 2 wt % and less than or equal to 8 wt %, or even greater than or equal to 2 wt % and less than or equal to 6 wt %, or any and all sub-ranges formed from any of these endpoints.

The binder solution further includes at least one binder. The binder imparts strength to the green body part by binding the particulate material and layers thereof together after the curing step in which some or all of the solvent of the binder solution is evaporated. Suitable binders include, but are not limited to, thermoplastic binders, thermoset binders, and non-polymeric binders such as waxes and sugars (e.g., glucose, fructose, derivatives thereof, or a combination thereof).

In embodiments, the binder comprises a thermoplastic binder comprising one or more thermoplastic polymer strands. In embodiments, the thermoplastic binder is selected from a class of thermoplastic polymers that generally decompose into small oligomers, carbon dioxide and water without requiring the presence of oxygen. Accordingly, in embodiments, the thermoplastic binder may be cleanly and readily removed during debinding and sintering to generate a consolidated part that is substantially free of the thermoplastic binder and decomposition products (e.g., char and metal oxides).

In embodiments, the one or more thermoplastic polymer strands includes a first polymer strand. In embodiments, the first polymer strand includes at least a first functional group. Functional groups of the first thermoplastic polymer strand may include, by way of example and not limitation, hydrogen bond donors, hydrogen bond acceptors, negatively charged groups, positively charged groups, or combinations thereof. In embodiments, the first functional group is part of the backbone of the first thermoplastic polymer strand. In embodiments, the first functional group of the first polymer strand complements a functional group of a second polymer strand of the thermoplastic binder to facilitate non-covalent coupling of the first and second polymer strands. For example, in embodiments, the first functional group is selected from hydroxyl groups, carboxylate groups, amine, thiol, amide, or other suitable functional groups that enable weak, non-covalent coupling of the first and second polymer strands.

In water soluble embodiments, the first polymer strand includes polymers such as, but not limited to, polyvinyl alcohol (PVA), polyamides, polyacryl amide (PAAm), derivatives thereof, and combinations thereof. In organic solvent soluble embodiments, the first polymer strand includes polymethylmethacrylate (PMMA), polyvinyl carbonate, derivatives thereof, and combinations thereof. In embodiments, the first polymer strand has an average molecular weight (Mw or weight average) greater than or equal to 1,000 g/mol and less than or equal to 50,000 g/mol. In embodiments, the first polymer strand may have an average molecular weight greater than or equal to 1,000 g/mol and less than or equal to 50,000 g/mol, greater than or equal to 1,000 g/mol and less than or equal to 30,000 g/mol, greater than or equal to 1,000 g/mol and less than or equal to 25,000 g/mol, greater than or equal to 1,000 g/mol and less than or equal to 23,000 g/mol, greater than or equal to 5,000 g/mol and less than or equal to 50,000 g/mol, greater than or equal to 5,000 g/mol and less than or equal to 30,000 g/mol, greater than or equal to 5,000 g/mol and less than or equal to 25,000 g/mol, greater than or equal to 5,000 g/mol and less than or equal to 23,000 g/mol, greater than or equal to 7,000 g/mol and less than or equal to 50,000 g/mol, greater than or equal to 7,000 g/mol and less than or equal to 30,000 g/mol, greater than or equal to 7,000 g/mol and less than or equal to 25,000 g/mol, greater than or equal to 7,000 g/mol and less than or equal to 23,000 g/mol, greater than or equal to 9,000 g/mol and less than or equal to 50,000 g/mol, greater than or equal to 9,000 g/mol and less than or equal to 30,000 g/mol, greater than or equal to 9,000 g/mol and less than or equal to 25,000 g/mol, greater than or equal to 9,000 g/mol and less than or equal to 23,000 g/mol, greater than or equal to 13,000 g/mol and less than or equal to 50,000 g/mol, greater than or equal to 13,000 g/mol and less than or equal to 30,000 g/mol, greater than or equal to 13,000 g/mol and less than or equal to 25,000 g/mol, greater than or equal to 13,000 g/mol and less than or equal to 23,000 g/mol, greater than or equal to 23,000 and less than or equal to 50,000 g/mol, greater than or equal to 23,000 g/mol and less than or equal to 30,000 g/mol, greater than or equal to 23,000 g/mol and less than or equal to 25,000 g/mol, greater than or equal to 25,000 g/mol and less than or equal to 50,000 g/mol, greater than or equal to 25,000 g/mol and less than or equal to 30,000 g/mol, or even greater than or equal to 30,000 g/mol and less than or equal to 50,000 g/mol, or any and all sub-ranges formed from any of these endpoints.

The first polymer strand is present in the binder solution in an amount greater than or equal to 1 wt % and less than or equal to 15 wt %, greater than or equal to 1 wt % and less than or equal to 10 wt %, greater than or equal to 1 wt % and less than or equal to 7 wt %, greater than or equal to 3 wt % and less than or equal to 15 wt %, greater than or equal to 3 wt % and less than or equal to 10 wt %, greater than or equal to 3 wt % and less than or equal to 7 wt %, greater than or equal to 5 wt % and less than or equal to 15 wt %, greater than or equal to 5 wt % and less than or equal to 10 wt %, or even greater than or equal to 5 wt % and less than or equal to 7 wt %, or any and all sub-ranges formed from any of these endpoints, based on a total weight of the binder solution. In embodiments, the first polymer strand may be at least 80% soluble by weight in the solvent at STP.

In embodiments, the one or more thermoplastic polymer strands further includes a second polymer strand. In water soluble binder embodiments, the second polymer strand includes at least a second functional group different from the first functional group of the first polymer strand. Functional groups of the second thermoplastic polymer strand may include, by way of example and not limitation, hydrogen bond donors, hydrogen bond acceptors, negatively charged groups, positively charged groups, or combinations thereof. In embodiments, the second functional group is part of the backbone of the second thermoplastic polymer strand. In embodiments, the second functional group of the second polymer strand complements the first functional group of the first polymer strand of the thermoplastic binder to facilitate non-covalent coupling of the first and second polymer strands. For example, in embodiments, the second functional group may be selected from hydroxyl groups, carboxylate groups, amine, thiol, amide, or other suitable functional groups that enable weak, non-covalent coupling of the first and second polymer strands.

In water soluble binder embodiments, the second polymer strand includes polymers such as, but not limited to, polyacrylic acid (PAA), poly methacrylic acid (PmAA), derivatives thereof, and combinations thereof. In embodiments, the second polymer strand has an average molecular weight (Mw or weight average) greater than or equal to 100 g/mol and less than or equal to 10,000 g/mol. For example, the second polymer strand may have an average molecular weight greater than or equal to 100 g/mol and less than or equal to 10,000 g/mol, greater than or equal to 100 g/mol and less than or equal to 5,000 g/mol, greater than or equal to 500 g/mol and less than or equal to 10,000 g/mol, or even greater than or equal to 500 g/mol and less than or equal to 5,000 g/mol, or any and all sub-ranges formed from any of these endpoints.

The second polymer strand is present in the binder solution in an amount greater than or equal to 1 wt % and less than or equal to 10 wt %, greater than or equal to 1 wt % and less than or equal to 9 wt %, greater than or equal to 1 wt % and less than or equal to 8 wt %, greater than or equal to 1 wt % and less than or equal to 7 wt %, greater than or equal to 1 wt % and less than or equal to 6 wt %, or even greater than or equal to 1 wt % and less than or equal to 5 wt %, or any and all sub-ranges formed from any of these endpoints, based on a total weight of the binder solution. In embodiments, the second polymer strand may be at least 80% soluble by weight in the solvent at STP.

In water soluble binder embodiments, the first polymer strand includes a different polymer than the second polymer strand. In embodiments, the first polymer strand comprises polyvinyl alcohol (PVA) and the second polymer strand comprises polyacrylic acid (PAA).

The first polymer strand and the second polymer strand are included in the binder solution in amounts to enable coupling between the first polymer strand and the second polymer strand such that the green body part has a sufficient green strength to withstand handling during post-printing processes. In embodiments, the weight ratio of the first polymer strand to the second polymer strand is greater than or equal to 3:1 and less than or equal to 7:1. For example, the weight ratio of the first polymer strand to the second polymer strand may be 3:1, 4:1, 5:1, 6:1, or 7:1. In embodiments, the binder solution includes a weight ratio of polyvinyl alcohol (PVA) to polyacrylic acid (PAA) greater than or equal to 3:1 to less than or equal to 4:1.

In embodiments, the one or more thermoplastic polymer strands further includes a third polymer strand. The third polymer strand includes water soluble polymers such as, but not limited to, polyoxazoline, polyvinyl methyl ether maleic anhydride (PVME-MA), polyvinyl pyrrolidone (PVP), polyvinyl methyl ether-maleic anhydride (PVME-MA), and an organic solvent soluble such as polymethyl methacrylate (PMMA), polybutyl methacrylate (PBMA), polycarbonate (PC), polyethylene (PE), derivatives thereof, and combinations thereof. In embodiments, the third polymer strand has an average molecular weight (Mw or weight average) greater than or equal to 100 g/mol and less than or equal to 10,000 g/mol. For example, the third polymer strand may have an average molecular weight greater than or equal to 100 g/mol and less than or equal to 10,000 g/mol, greater than or equal to 100 g/mol and less than or equal to 5,000 g/mol, greater than or equal to 500 g/mol and less than or equal to 10,000 g/mol, or even greater than or equal to 500 g/mol and less than or equal to 5,000 g/mol, or any and all sub-ranges formed from any of these endpoints.

In embodiments, third polymer strand is present in the binder solution in an amount greater than or equal to 1 wt % and less than or equal to 10 wt %, greater than or equal to 1 wt % and less than or equal to 9 wt %, greater than or equal to 1 wt % and less than or equal to 8 wt %, greater than or equal to 1 wt % and less than or equal to 7 wt %, greater than or equal to 1 wt % and less than or equal to 6 wt %, or even greater than or equal to 1 wt % and less than or equal to 5 wt %, or any and all sub-ranges formed from any of these endpoints, based on a total weight of the binder solution. In embodiments, the third polymer strand may be at least 80% soluble by weight in the solvent at STP.

Additionally, the binder solution further includes at least one solvent. The solvent may be aqueous or non-aqueous depending on the selected thermoplastic binder and other additives that may be in the binder solution. The solvent may be generally non-reactive (e.g., inert) such that it does not react with the particulate material, the thermoplastic binder, or any other additives that may be in the binder solution. In embodiments, at least a portion of the solvent may readily evaporate during deposition of the binder solution into the layer of particulate material, prior to thermal curing, and facilitate bonding of the particulate material. In embodiments, the solvent may be, by way of example and not limitation, water, methylene chloride, chloroform, toluene, xylene, mesitylene, anisole, 2-methoxy ethanol, butanol, 1-methoxy-2-propanol, 2-butoxy ethanol, ethylene glycol, ethylene glycol butyl ether, diethylene glycol, tetrahydrofuran (THF), methyl ethyl ketone (MEK), trichloroethylene (TCE), or combinations thereof. In embodiments, the solvent is present in the binder solution in an amount greater than or equal to 1 wt % and less than or equal to 85 wt %, greater than or equal to 1 wt % and less than or equal to 75 wt %, greater than or equal to 1 wt % and less than or equal to 50 wt %, greater than or equal to 1 wt % and less than or equal to 25 wt %, greater than or equal to 1 wt % and less than or equal to 10 wt %, greater than or equal to 10 wt % and less than or equal to 85 wt %, greater than or equal to 10 wt % and less than or equal to 75 wt %, greater than or equal to 10 wt % and less than or equal to 50 wt %, greater than or equal to 10 wt % and less than or equal to 25 wt %, greater than or equal to 25 wt % and less than or equal to 85 wt %, greater than or equal to 25 wt % and less than or equal to 75 wt %, greater than or equal to 25 wt % and less than or equal to 50 wt %, greater than or equal to 50 wt % and less than or equal to 85 wt %, or even greater than or equal to 50 wt % and less than or equal to 75 wt %, or any and all sub-ranges formed from any of these endpoints, based on a total weight of the binder solution.

In embodiments, the binder solution includes nickel nitrate, polyvinyl pyrrolidone (PVP), and 2-methoxy ethanol.

In embodiments, the binder solution includes ferrocene, polystyrene, and benzene, toluene, or a chlorinated solvent, such as dichloroethane.

In embodiments, the binder solution includes nickel chloride, polyvinyl alcohol (PVA), polyacrylic acid (PAA), and water.

In embodiments, the binder solution includes nickel formate, polyvinyl alcohol (PVA), polyacrylic acid (PAA), and water.

In embodiments, the binder solution includes iron chloride, polyvinyl alcohol (PVA), polyacrylic acid (PAA), and water.

In embodiments, the binder solution includes iron formate, polyvinyl alcohol (PVA), polyacrylic acid (PAA), and water.

In embodiments, the viscosity of the binder solution meets print head specifications to ensure jettability of the binder solution. In embodiments, the binder solution has a viscosity greater than or equal to 1 cP and less than or equal to 40 cP, greater than or equal to 1 cP and less than or equal to 35 cP, greater than or equal to 1 cP and less than or equal to 25 cP, greater than or equal to 1 cP and less than or equal to 20 cP, greater than or equal to 2 cP and less than or equal to 40 cP, greater than or equal to 2 cP and less than or equal to 35 cP, greater than or equal to 2 cP and less than or equal to 30 cP, greater than or equal to 2 cP and less than or equal to 25 cP, or even greater than or equal to 2 cP and less than or equal to 20 cP, or any and all sub-ranges formed from any of these endpoints. To achieve such viscosities, in embodiments, a rheology modifier may be included in the binder solution as an optional additive.

Accordingly, in embodiments, the binder solution may optionally include one or more additives that facilitates jettability of the binder solution and deposition of the binder solution into the layer of particulate material by adjusting the viscosity of the binder solution. Optional additives include surfactants, diluents, viscosity modifiers, dispersants, stabilizers, or any other additive. In embodiments, the surfactants may be ionic (e.g., zwitterionic, cationic, anion) or non-ionic depending on the properties of the thermoplastic binder and/or the particulate material. In embodiments, the surfactant may comprise polypropoxy quaternary ammonium chloride (e.g., VARIQUAT™ CC 42 NS available from Evonik Industries), oligomers of hexanoic acid, alkylene oxide copolymer (e.g., HYPERMER™ KD2 available from Croda Advanced Materials), alkylene esters of fatty acids and alkylamines, 2-[4-(2,4,4-trimethylpentan-2-yl)phenoxy]ethanol (e.g., TRITON™ X-100 available from The Dow Chemical Company), polyoxyethylene (80) sorbitan monooleate (e.g., TWEEN™ 80 available from Croda Americas, Inc.), polyoxyethylene-23-lauryl ether (e.g., BRIJ™ L23 available from Croda Americas, Inc.), sodium dodecyl sulfate (SDS), hexadecyltrimethylammonium bromide (CTAB), dodecyltrimethylammonium bromide (DTAB), or a combination thereof.

Figure 2:
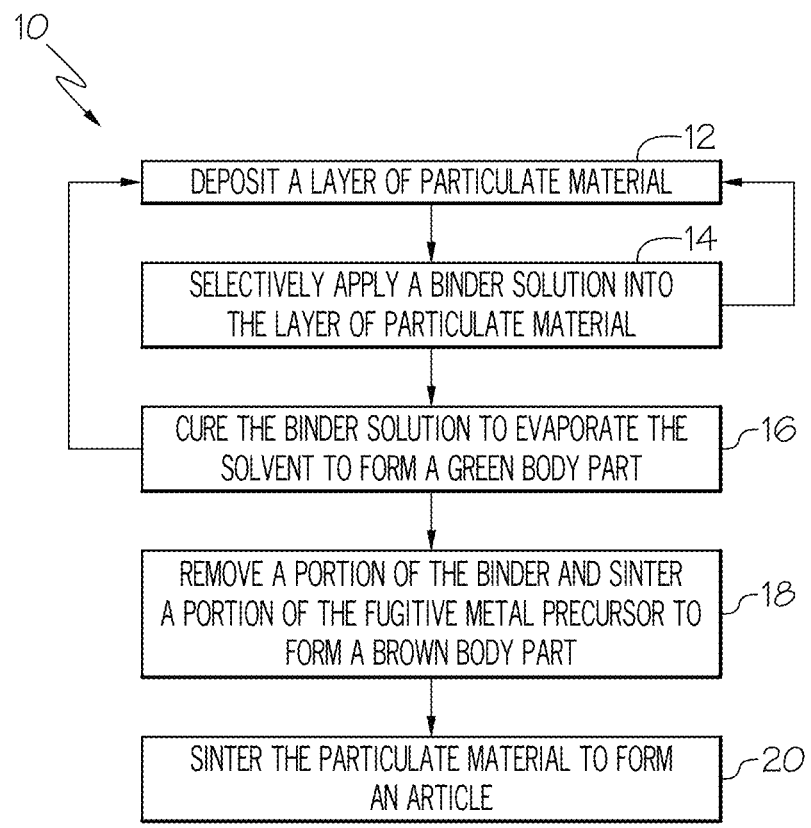
FIG. 2 is a flow diagram of an embodiment of a method of manufacturing a consolidated part via an additive manufacturing process using an example binder solution comprising a fugitive metal precursor according to one or more embodiments described herein.

Referring now to FIG. 2, a method of manufacturing a consolidated part via additive manufacturing using the binder solution according to embodiments described herein is shown at 10. To facilitate discussion of aspects of the method 10, reference is also made to FIG. 3, which is a block diagram depicting an embodiment of an additive manufacturing apparatus 30 that may be used to perform the method 10. The method 10 begins at block 12 with depositing a layer 22 of a particulate material 24 (e.g., creating a powder bed), as shown in FIG. 4, on a working surface. In embodiments, the layer 22 may have a thickness 26 greater than or equal to 10 microns (μm) and less than or equal to 200 μm. The particulate material 24 used to print the part may vary depending on the type of part and the end use of the part.

In particular, the particulate material 24 may include a metal particulate material, such as a nickel alloy (e.g., Inconel 625, Inconel 718, Rene'108, Rene'80, Rene'142, Rene'195, and Rene'M2, Marm-247), a cobalt alloy (e.g., Hans 188, L605, X40, X45, and FSX414), a cobalt-chromium alloy, a titanium alloy, an aluminum-based material, a tungsten alloy, a stainless steel alloy, or a combination thereof. In embodiments, the metal particulate material may comprise particles having a particle size distribution greater than or equal to 1 microns (μm) and less than or equal to 75 μm. Such particulate materials may be used to print metal articles including, by way of example and not limitation, fuel tips, fuel nozzles, shrouds, micro mixers, or turbine blades.

In embodiments, the particulate material 24 may include a ceramic particulate material, such as alumina, aluminum nitride, zirconia, titania, silica, silicon nitride, silicon carbide, boron nitride, or a combination thereof. In embodiments, the ceramic particulate material may comprise particles having a particle size distribution greater than or equal to 0.1 μm and less than or equal to 100 μm. Such particulate materials may be used to print ceramic articles for use in, by way of example and not limitation, the medical and transportation industries.

Referring back to FIG. 2, at block 14, following the deposition of particulate material 24, the method 10 continues with selectively depositing a binder solution into a portion of the layer 22 according to a pattern. For example, the binder solution may be selectively printed into the layer 22 of particulate material 24 using a print head that is operated by a controller based on a CAD design that includes a representation of a layer of the consolidated part being printed.

Figure 3:
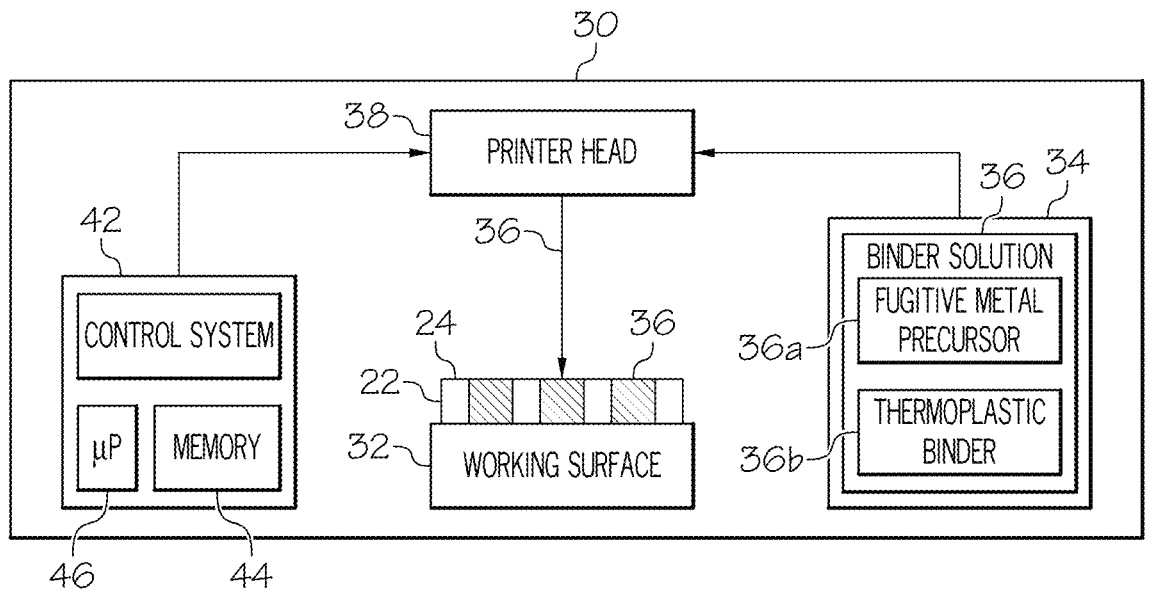
FIG. 3 is a block diagram of an embodiment of an additive manufacturing apparatus used to manufacture the consolidated part in accordance with the method of FIG. 2.
Figure 4:
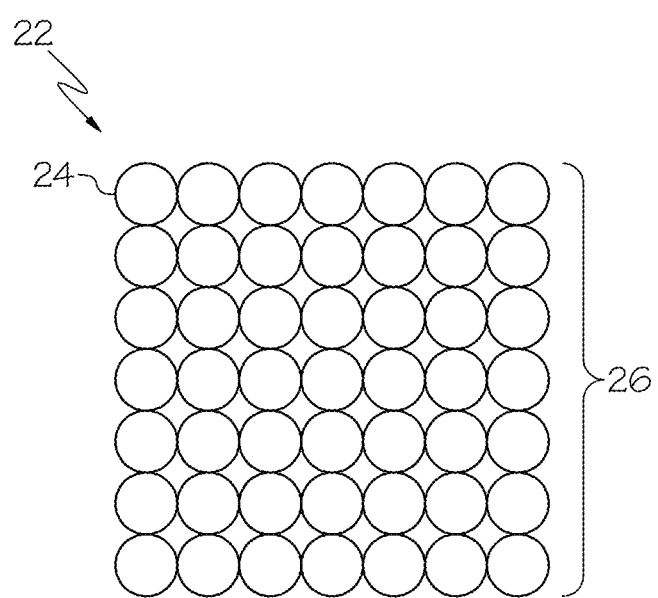
FIG. 4 is a schematic diagram of an embodiment of a layer of particulate material from which the consolidated part is manufactured resulting from the acts of the method of FIG. 2.

For example, as shown in FIG. 3, the additive manufacturing apparatus 30 may be a binder jet printer that selectively deposits the binder solution into the layer 22 according to the act of block 14 (FIG. 2). In embodiments, the binder jet printer 30 may include a working surface 32 that supports the layer 22 of particulate material 24, a reservoir 34 that stores a binder solution 36, and a printer head 38 that is fluidly coupled to the reservoir 34. The printer head 38 selectively deposits the binder solution 36 into the layer 22 of particulate material 24 to print the binder solution 36 onto and into the layer 22 in a pattern that is representative of a layer of the consolidated part being printed. In embodiments, the binder jet printer 30 may include a control system 42 for controlling operation of the binder jet printer 30. The control system 42 may include a distributed control system (DCS) or any computer-based workstation that is fully or partially automated. In embodiments, the control system 42 may be any suitable device employing a general purpose computer or an application-specific device, which may generally include memory circuitry 44 storing one or more instructions for controlling operation of the binder jet printer 30. The memory circuitry 44 may store CAD designs representative of a structure of the consolidated part being printed. The processor may include one or more processing devices (e.g., microprocessor 46), and the memory circuitry 44 may include one or more tangible, non-transitory, machine-readable media collectively storing instructions executable by the processer to control actions described herein.

The binder solution 36 deposited into the layer of material may be, for example, any one of the embodiments of the binder solution described herein, comprising a fugitive metal precursor 36a and a thermoplastic binder 36b. In embodiments, the particular binder solution 36 is selected based, at least in part, on the particulate material 24 used to form the layer 22. For example, in embodiments, the fugitive metal precursor 36a of the binder solution 36 and the particulate material 24 may comprise one of more of the same elements. For example, in embodiments in which the particulate material 24 is a metal particulate material comprising nickel, the fugitive metal precursor 36a of the binder solution 36 may comprise nickel or a nickel-based compound. As another example, in embodiments in which the particulate material 24 is a metal particulate material comprising a nickel alloy, a cobalt alloy, a cobalt chromium alloy, a titanium alloy, an aluminum-based material, a tungsten alloy, a stainless steel alloy, or the like, the binder solution 36 includes a fugitive metal precursor 36a in the form of a salt comprising nickel chloride, iron chloride, nickel formate, copper chloride, silver nitrate, nickel nitrate, copper nitrate, or the like. As another example, in embodiments in which the particulate material 24 is a ceramic particulate material comprising alumina, aluminum nitride, zirconia, titania, silica, silicon nitride, silicon carbide, or boron nitride, the binder solution 36 includes a fugitive metal precursor 36a in the form of a salt comprising aluminum nitrate, magnesium chloride, barium nitrate, barium chloride, titanium nitrate, or the like.

Figure 5:
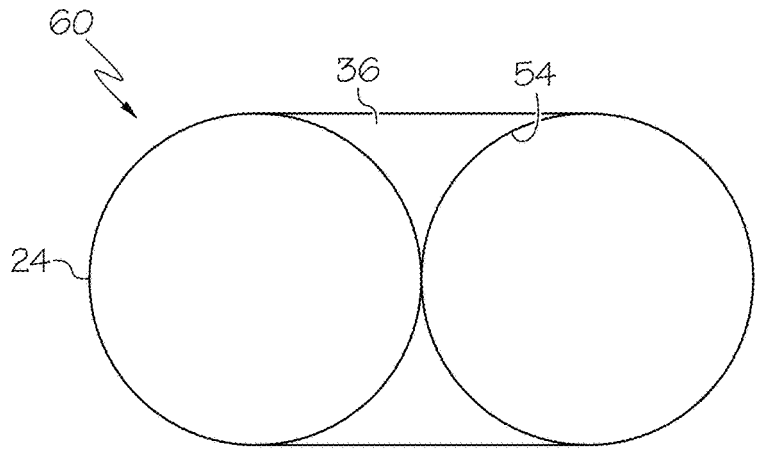
FIG. 5 is a schematic view of the particulate material after deposition of the binder solution in accordance with the method of FIG. 2.

Referring now to FIG. 5, after deposition, the binder solution 36 at least partially coats an outer surface 54 of the particulate material 24, thereby generating binder-coated particles. As discussed herein, upon curing, the thermoplastic binder of the binder solution 36 bonds the particulate material 24 according to the pattern of the binder solution 36 printed into the layer 22 of particulate material 24 to form a layer of the green body part 60.

The method 10 may repeat the acts of blocks 12 and 14 to continue building up the part in a layer-by-layer manner until a desired number of layers have been printed. The thermoplastic binder of the binder solution 36 bonds each successive layer 22 and provides a certain degree of strength (e.g., green strength) to the printed part such that the integrity of the structure of the printed green body part 60 is maintained during post-printing processes (e.g., e.g., transferring, inspecting, depowdering). That is, the green strength provided by the thermoplastic binder of the binder solution 36 maintains bonding between the particles of the particulate material 24 within the layers 22 and blocks (e.g., resists, prevents) delamination of the layers 22 during handling and post-printing processing of the green body part 60.

Following deposition of the layer 22 and printing of the binder solution 36 as set forth in blocks 12 and 14 of FIG. 2, the method 10 continues at block 16 with curing the binder solution 36 to form a green body part 60. For example, as discussed hereinabove, the binder solution 36 is a mixture of a fugitive metal precursor, a thermoplastic binder, and a solvent. While a portion of the solvent in the binder solution 36 may be evaporated during deposition (e.g., printing) of the binder solution 36, a certain amount of the solvent may remain within the layer 22 of the particulate material 24. Therefore, in embodiments, the binder solution 36 may be thermally cured at a temperature that is suitable for evaporating the solvent remaining in the printed layer 22 and allowing efficient bonding of the printed layers 22, thereby forming the green body part 60. Heat may be applied to the printed part using an IR lamp and/or heated plate, or may be carried out by placing the printed part in an oven. In embodiments, curing the binder solution 36 comprises heating the printed layers 22 at a temperature greater than or equal to 25° C. and less than or equal to 100° C., greater than or equal to 30° C. and less than or equal to 90° C., greater than or equal to 35° C. and less than or equal to 80° C., or even greater than or equal to 40° C. and less than or equal to 70° C., or any and all sub-ranges formed from any of these endpoints.

In embodiments, after the part is cured to remove the solvent, the thermoplastic binder present in the green body part 60 bond the particulate material 24 of the plurality of layers 22. In embodiments, the amount of fugitive metal precursor in the green body part 60 may is, based on a total weight of the green body part 60, greater than or equal to 0.5 wt % and less than or equal to 5 wt %, greater than or equal to 0.5 wt % and less than or equal to 4.5 wt %, greater than or equal to 0.5 wt % and less than or equal to 4 wt %, greater than or equal to 0.5 wt % and less than or equal to 3.5 wt %, greater than or equal to 0.5 wt % and less than or equal to 3 wt %, greater than or equal to 0.5 wt % and less than or equal to 2.5 wt %, greater than or equal to 0.5 wt % and less than or equal to 2 wt %, greater than or equal to 0.5 wt % and less than or equal to 1.5 wt %, greater than or equal to 1 wt % and less than or equal to 5 wt %, greater than or equal to 1 wt % and less than or equal to 4.5 wt %, greater than or equal to 1 wt % and less than or equal to 4 wt %, greater than or equal to 1 wt % and less than or equal to 3.5 wt %, greater than or equal to 1 wt % and less than or equal to 3 wt %, greater than or equal to 1 wt % and less than or equal to 2.5 wt %, greater than or equal to 1 wt % and less than or equal to 2 wt %, greater than or equal to 1.5 wt % and less than or equal to 5 wt %, greater than or equal to 1.5 wt % and less than or equal to 4.5 wt %, greater than or equal to 1.5 wt % and less than or equal to 4 wt %, greater than or equal to 1.5 wt % and less than or equal to 3.5 wt %, greater than or equal to 1.5 wt % and less than or equal to 3 wt %, greater than or equal to 1.5 wt % and less than or equal to 2.5 wt %, greater than or equal to 2 wt % and less than or equal to 5 wt %, greater than or equal to 2 wt % and less than or equal to 4.5 wt %, greater than or equal to 2 wt % and less than or equal to 4 wt %, greater than or equal to 2 wt % and less than or equal to 3.5 wt %, greater than or equal to 2 wt % and less than or equal to 3 wt %, greater than or equal to 2.5 wt % and less than or equal to 5 wt %, greater than or equal to 2.5 wt % and less than or equal to 4.5 wt %, greater than or equal to 2.5 wt % and less than or equal to 4 wt %, greater than or equal to 2.5 wt % and less than or equal to 3.5 wt %, greater than or equal to 3 wt % and less than or equal to 5 wt %, greater than or equal to 3 wt % and less than or equal to 4.5 wt %, or even greater than or equal to 3 wt % and less than or equal to 4 wt %, or any and all sub-ranges formed from any of these endpoints. In embodiments, the amount of thermoplastic binder in the green body part 60 is, based on a total weight of the green body part 60, greater than or equal to 0.5 wt % and less than or equal to 3 wt %, greater than or equal to 0.5 wt % and less than or equal to 2.5 wt %, greater than or equal to 0.5 wt % and less than or equal to 2 wt %, greater than or equal to 0.5 wt % and less than or equal to 1.5 wt %, greater than or equal to 1 wt % and less than or equal to 3 wt %, greater than or equal to 1 wt % and less than or equal to 2.5 wt %, greater than or equal to 1 wt % and less than or equal to 2 wt %, greater than or equal to 1.5 wt % and less than or equal to 3 wt %, greater than or equal to 1.5 wt % and less than or equal to 2.5 wt %, or even greater than or equal to 2 wt % and less than or equal to 3 wt %, or any and all sub-ranges formed from any of these endpoints. In embodiments, the particulate material makes up substantially all of remaining percentage after totaling the amount of fugitive metal precursor and the amount of thermoplastic binder in the green body part 60. In embodiments, to determine the weight percentage of the particulate material, the thermoplastic material, and the fugitive metal precursor in the green body part 60, the particulate material used to form the green body part 60 is weighed. Then, a green body part is printed with the thermoplastic binder and no fugitive metal precursor and weighed. The weight of the particulate material is subtracted from the weight of the printed green body part with the thermoplastic binder to determine the weight of the thermoplastic binder. Then, a green body part 60 is printed with the thermoplastic binder and fugitive metal precursor and weighed. The weight of the printed green body part with the thermoplastic binder is subtracted from the weight of the printed green body part 60 with the thermoplastic binder and the fugitive metal precursor to determine the weight of the fugitive metal precursor. Weight percentage of each of the components may then be calculated.

Unbound particles from the powder layer (e.g., the particulate material 24 that is not bonded by the binder solution 36) may be removed after curing to prepare the green body part 60 for post-printing steps, such as debinding and sintering.

After curing, the green body part 60 may undergo an optional drying step (not shown) to remove any residual solvent and/or other volatile materials that may remain in the green body part 60. For example, the green body part 60 may be dried in a vacuum, under an inert atmosphere (e.g., nitrogen ($N_2$), or argon (Ar)) or air at slightly elevated or room temperatures.

In embodiments, the green body part 60 comprises a strength greater than or equal to 5 MPa, greater than or equal to 5.5 MPa, greater than or equal to 6 MPa, greater than or equal to 6.5 MPa, greater than or equal to 7 MPa, greater than or equal to 7.5 MPa, greater than or equal to 8 MPa, greater than or equal to 8.5 MPa, greater than or equal to 9 MPa, greater than or equal to 9.5 MPa, or even greater than or equal to 10 MPa.

Figure 6:
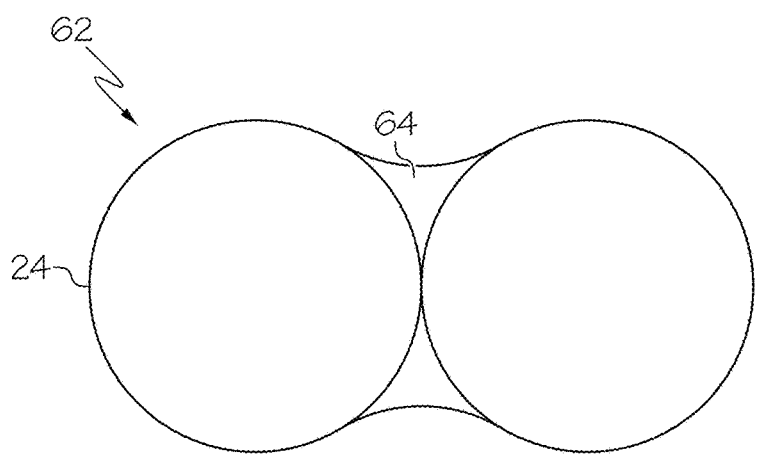
FIG. 6 is a schematic view of the particulate material after debinding in accordance with the method of FIG. 2.

Following the curing of the binder solution 36 to form the green body part 60, the method 10 continues at block 18 with heating the green body part 60 above a first temperature to remove at least a portion of the thermoplastic binder (e.g., debinding) to form a brown body part 62. In embodiments, the decomposition temperature of the fugitive metal precursor of the binder solution 36 is lower than the first temperature. As such, during debinding, at least a portion of the fugitive metal precursor of the binder solution 36 decomposes, resulting in in-situ metal formation of a metallic material 64. For example, as shown in FIG. 6, during the debinding step, the fugitive metal precursor of the binder solution 36 may decompose into metallic material 64 of nanometer-scale dimensions. Metallic material 64 has a very high ratio of surface area to volume, which may provide a high driving force toward sintering. As the metallic material 64 sinters, it may promote the formation of "bridges," such as necked regions of the metallic material 64 between adjacent particles of the particulate material 24. The necked regions of the metallic material 64 bridging the particulate material 24 thereby increases the brown strength of the brown body part 62 after the thermoplastic binder is burned out but prior to consolidation (i.e., sintering) of the particulate material 24. In embodiments, the first temperature is greater than or equal to 60° C. and less than or equal to 700° C., greater than or equal to 70° C. and less than or equal to 600° C., greater than or equal to 75° C. and less than or equal to 500° C., or even greater than or equal to 80° C. and less than or equal to 400° C., or any and all sub-ranges formed from any of these endpoints.

In embodiments, heating the green body part 60 above a first temperature may include heating the green body part 60 in an oxygen-free environment (e.g., in a vacuum chamber/under inert atmosphere) or in air. In metal embodiments, debinding may be performed in an oxygen-free environment, such as, by way of example and not limitation, under nitrogen ($N_2$), argon (Ar), another inert gas, or under vacuum. In ceramic embodiments, the debinding may be performed in air or in any other environment suitable for the specific materials being processed.

In embodiments, the brown body part 62 may comprise a strength greater than or equal to 1 MPa, greater than or equal to 1.5 MPa, greater than or equal to 2 MPa, greater than or equal to 2.5 MPa, greater than or equal to 3 MPa, greater than or equal to 3.5 MPa, greater than or equal to 4 MPa, greater than or equal to 4.5 MPa, or even greater than or equal to 5 MPa.

Figure 7:
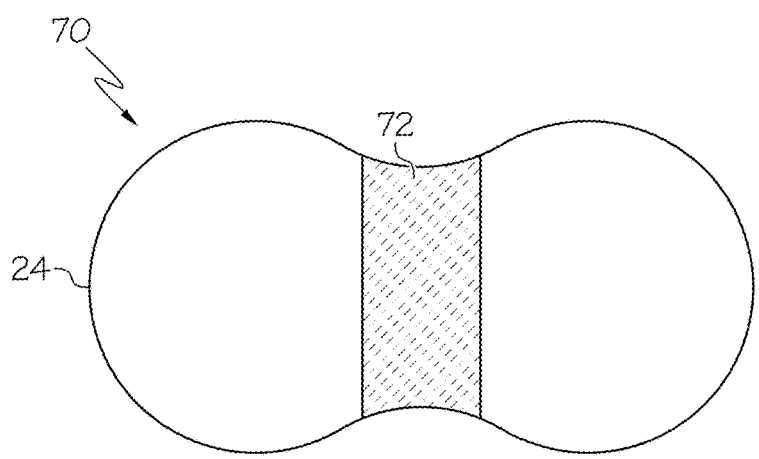
FIG. 7 is a schematic view of the particulate material after sintering in accordance with the method of FIG. 2.

The method 10 illustrated in FIG. 2 concludes at block 20 with heating the brown body part 62 above a second temperature to sinter the particulate material 24 thereby forming the consolidated part 70. In embodiments, the second temperature is greater than or equal to the temperature at which the particulate material 24 sinters. As such, by heating the brown body part 62 above a second temperature, the particulate material 24 sinters with the metallic material 64 (FIG. 6) thereby forming a metallic phase 72, as shown in FIG. 7. In embodiments, the second temperature is greater than or equal to 75° C. and less than or equal to 1500° C., greater than or equal to 75° C. and less than or equal to 1450° C., greater than or equal to 75° C. and less than or equal to 1400° C., greater than or equal to 100° C. and less than or equal to 1500° C., greater than or equal to 100° C. and less than or equal to 1450° C., greater than or equal to 100° C. and less than or equal to 1400° C., greater than or equal to 200° C. and less than or equal to 1500° C., greater than or equal to 200° C. and less than or equal to 1450° C., greater than or equal to 200° C. and less than or equal to 1400° C., greater than or equal to 300° C. and less than or equal to 1500° C., greater than or equal to 300° C. and less than or equal to 1450° C., greater than or equal to 300° C. and less than or equal to 1400° C., greater than or equal to 400° C. and less than or equal to 1500° C., greater than or equal to 400° C. and less than or equal to 1450° C., or even greater than or equal to 400° C. and less than or equal to 1400° C., or any and all sub-ranges formed from any of these endpoints. In embodiments, a nickel alloy, a cobalt alloy, or a stainless steel alloy may decompose at a temperature greater than or equal to 400° C. and less than or equal to 900° C.

In embodiments, heating the brown body part 62 above a second temperature may include heating the brown body part 62 in an oxygen-free environment (e.g., in a vacuum chamber/inert atmosphere). In metal embodiments, sintering may be performed under nitrogen ($N_2$), argon (Ar), another inert gas, or under vacuum. In ceramic embodiments, the sintering may be performed in air, or in any other environment suitable for the specific materials being processed.

In embodiments, the debinding of block 18 and the sintering of block 20 of method 10 illustrated in FIG. 2 occur in a single step.

Although various embodiments described herein are described with reference to method 10, it should be understood that embodiments of the binder solution described herein can be used with a variety of methods that are known and used by those skilled in the art. In particular, curing and sintering may be accomplished in a number of different ways, in a number of different steps, and in a number of different locations.

EXAMPLES

Embodiments will be further clarified by the following examples. It should be understood that these examples are not limiting to the embodiments described above.

One comparative and four example binder solutions were prepared for analysis. The formulations of the comparative and example binder solutions are provided in Table 1 (in terms of wt %).

TABLE 1

| Reduction to practice examples | | | | | |
|---|---|---|---|---|---|
| | Comp. Ex. 1 | Ex. 1 | Ex. 2 | Ex. 3 | Ex. 4 |
| Poly(vinyl alcohol) average Mw 10,000; 80% hydrolyzed | — | — | — | 7% | 7% |
| Poly(vinyl alcohol) average Mw 13,000-23,000; 87-89% hydrolyzed | 4.8% | 4.8% | 4.8% | — | — |
| Poly(acrylic acid) average MW 1,800 | 1% | 1% | 1% | — | — |
| Ethylene Glycol ReagentPlus®, ≥99% | 4% | 4% | 4% | — | — |
| Ethylene Glycol Butyl Ether | 9% | 9% | 9% | — | — |
| 3-amino-1-propanol | — | — | — | 28% | — |
| Methoxy Ethanol | — | — | — | 51% | — |
| Ethylene diamine | — | — | — | — | 8% |

TABLE 1-continued

Reduction to practice examples

|  | Comp. Ex. 1 | Ex. 1 | Ex. 2 | Ex. 3 | Ex. 4 |
|---|---|---|---|---|---|
| Ethanol amine | — | — | — | — | 50% |
| Acetyl acetone | — | — | — | — | 12% |
| NiCl$_2$ | 0% | 2% | 6% | — | — |
| Nickel formate dihydrate | — | — | — | 14% | 23% |
| Deionized Water | 81.2% | 79.2% | 77.2% | — | — |

Each of the binder solutions of Comparative Example 1 and Examples 1 and 2 were used to prepare a corresponding sample of a printed part. Following sintering, elemental analysis (LECO instruments: CS844 C/S analyzer and ONH836 Oxygen/Nitrogen/Hydrogen Elemental Analyzer) was performed on each of the sintered samples. The results of the elemental analysis are provided in Table 2.

TABLE 2

|  | Comp. Ex. 1 | Ex. 1 | Ex. 2 |
|---|---|---|---|
| Average of Carbon (wt %) | 0.0033 | 0.0043 | 0.0037 |
| StdDev of Carbon (wt %) | 0.0002 | 0.0005 | 0.0006 |
| Average of Oxygen (wt %) | 0.0047 | 0.0036 | 0.0032 |
| StdDev of Oxygen (wt %) | 0.0003 | 0.0002 | 0.0003 |
| Average of Sulfur (wt %) | 0.0005 | 0.0004 | 0.0007 |
| StdDev of Sulfur (wt %) | 0.0001 | 0.0003 | 0.0000 |
| Average of Nitrogen (wt %) | 0.0015 | 0.0017 | 0.0018 |
| StdDev of Nitrogen (wt %) | 0.0001 | 0.0002 | 0.0002 |
| Average of Hydrogen (wt %) | 0.0007 | 0.0008 | 0.0007 |
| StdDev of Hydrogen (wt %) | 0.0001 | 0.0001 | 0.0000 |

As shown in Table 2, the samples formed using Examples 1 and 2 had similar carbon and oxygen contents after sintering as the sample formed from Comparative Example 1 after sintering. While not wishing to be bound by theory, this suggests that the addition of the metal salt NiCl$_2$ to the binder solution did not have any negative effect on the chemical composition of the sintered part (e.g., charring).

Figure 8:
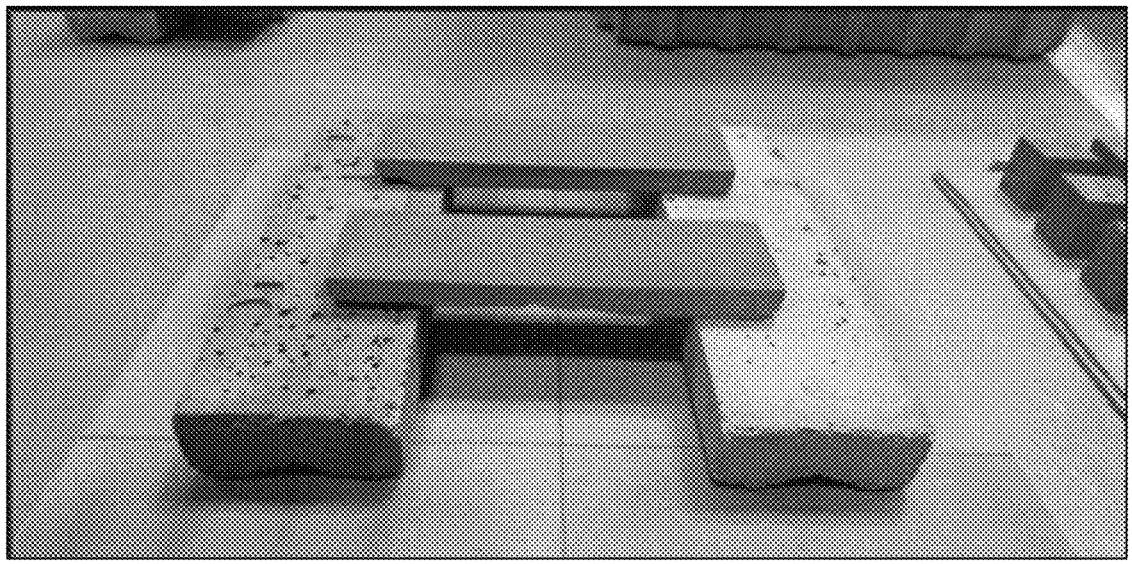
FIG. 8 is a photograph of samples formed using a comparative binder solution in accordance with the method of FIG. 2.
Figure 9:
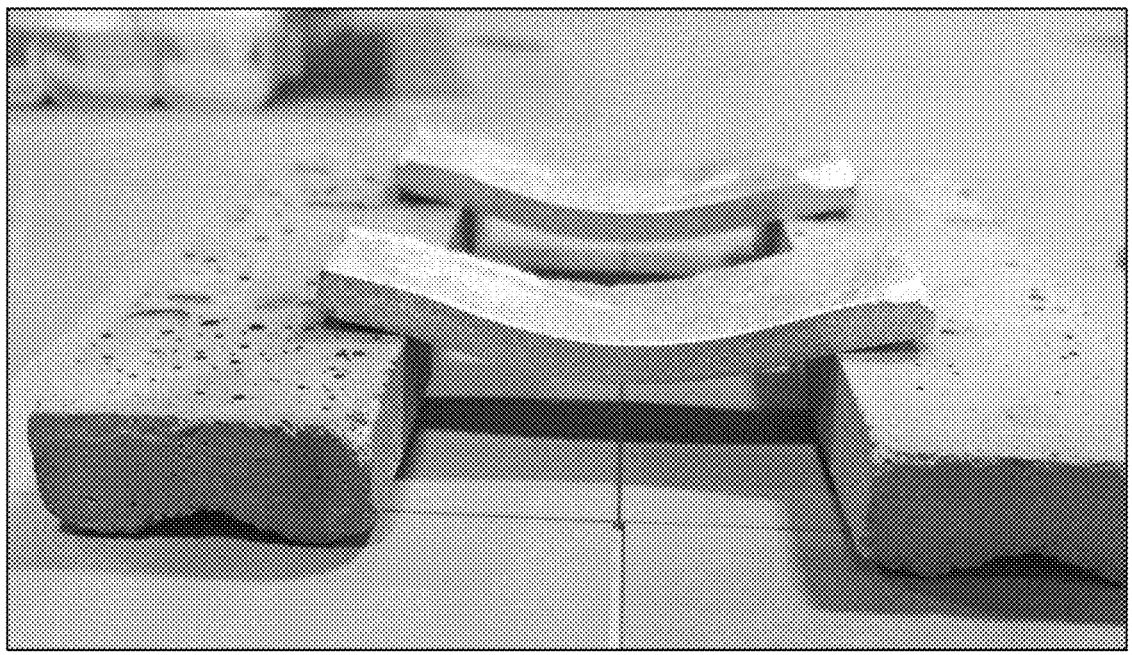
FIG. 9 is a photograph of the samples of FIG. 8 after sintering in accordance with the method of FIG. 2.
Figure 10:
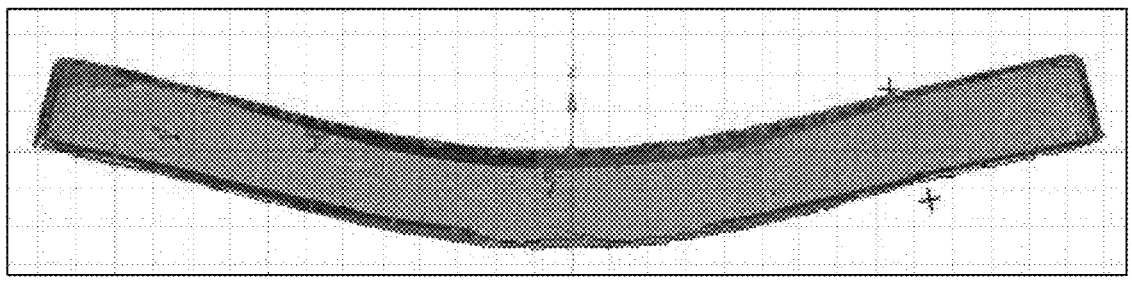
FIG. 10 is a distortion analysis of the samples of FIG. 9.
Figure 11:
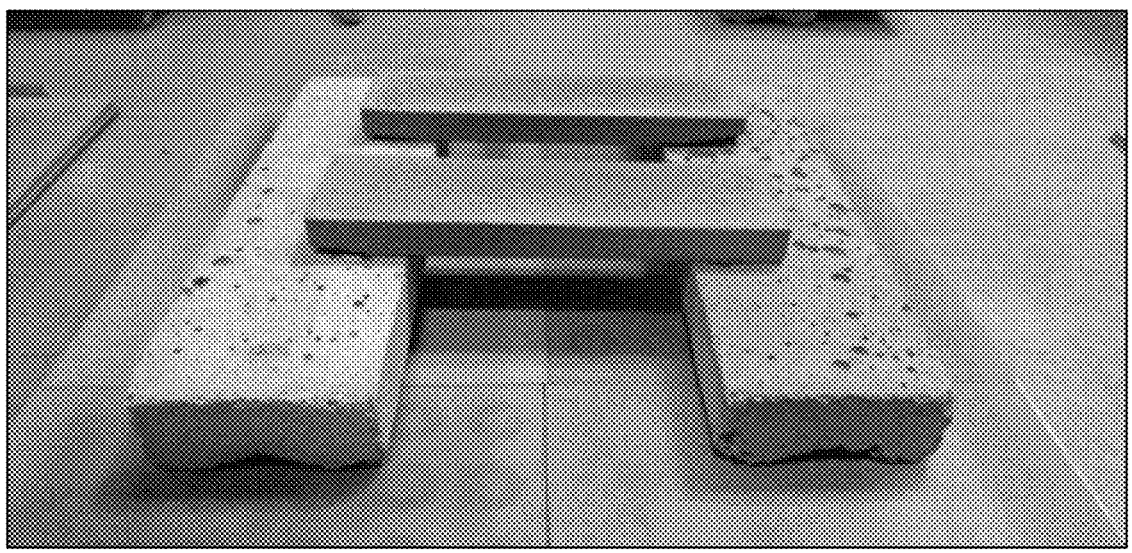
FIG. 11 is a photograph of samples formed using an example binder solution comprising a fugitive metal precursor according to one or more embodiments described herein in accordance with the method of FIG. 2.
Figure 12:
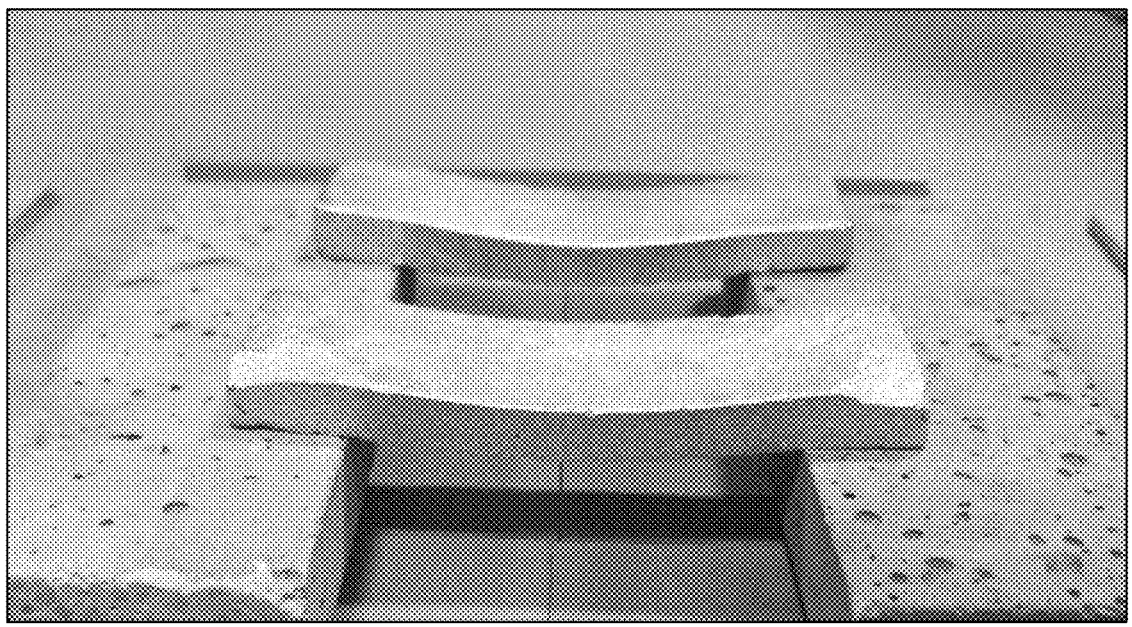
FIG. 12 is a photograph of the samples of FIG. 11 after sintering in accordance with the method of FIG. 2.
Figure 13:
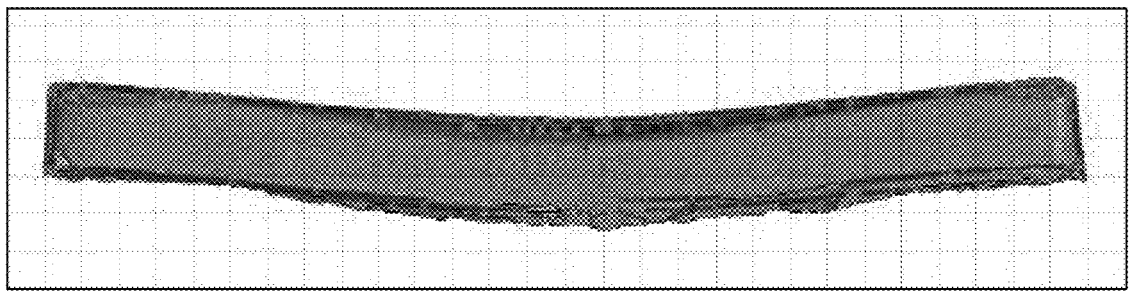
FIG. 13 is a distortion analysis of the samples of FIG. 12.

Additionally, two samples formed using Comparative Example 1 and two samples formed using Example 1 were positioned to span across two setter blocks as shown in FIG. 8 (Comparative Example 1) and FIG. 11 (Example 1). The samples were formed by filling rectangular shaped silicone molds with a fugitive metal precursor powder and adding the thermoplastic binder (e.g., via a dropper) to make a wet block. The silicone molds were placed in a conventional oven and cured at 200° C. for 1 hour. After cooling down, the sample blocks were ejected out of the molds. The samples were placed in an oven and sintered at 1390° C. for a period of 6 hours. As shown in FIGS. 9 and 10, the samples formed using the binder solution of Comparative Example 1 sagged during sintering due to gravity. As shown in FIGS. 12 and 13, the samples formed using the binder solution of Example 1 showed less sagging. While not wishing to be bound by theory, it is believed that the reduced sagging of the samples formed using the binder solution of Example 1 as compared to the samples formed using the binder solution of Comparative Example 1 may be attributed to the presence of the fugitive metal precursor (e.g., NiCl$_2$) in the binder solution of Example 1.

Further aspects of the invention are provided by the subject matter of the following clauses:

1. A binder solution comprising: greater than or equal to 0.5 wt % and less than or equal to 40 wt % of a fugitive metal precursor, based on a total weight of the binder solution; a thermoplastic binder comprising one or more thermoplastic polymer strands; and a solvent, wherein the fugitive metal precursor and the thermoplastic binder are dissolved in the solvent.

2. The binder solution of any preceding clause, wherein the binder solution comprises greater than or equal to 1 wt % and less than or equal to 20 wt % of the fugitive metal precursor, based on a total weight of the binder solution.

3. The binder solution of any preceding clause, wherein the fugitive metal precursor is selected from the group consisting of an alkaline earth metal, a transition metal, a post-transition metal, a metalloid, a rare earth metal, and combinations thereof.

4. The binder solution of any preceding clause, wherein the fugitive metal precursor comprises an organometallic compound, the organometallic compound comprising ferrocene, cobaltocene, iron pentacarbonyl, or a combination thereof.

5. The binder solution of any preceding clause, wherein the fugitive metal precursor comprises a salt, the salt comprising a compound selected from the group consisting of carboxylates, nitrates, sulfates, carbonates, formates, chlorides, halides, a derivative thereof, and combinations thereof.

6. The binder solution of any preceding clause, wherein the salt comprises nickel chloride, iron chloride, nickel formate, copper chloride, silver nitrate, nickel nitrate, copper nitrate, aluminum nitrate, magnesium chloride, barium nitrate, barium chloride, titanium nitrate, or a combination thereof.

7. The binder solution of any preceding clause, wherein each of the one or more thermoplastic polymer strands has an average molecular weight greater than or equal to 1000 g/mol and less than or equal to 50,000 g/mol.

8. The binder solution of any preceding clause, wherein each of the one or more thermoplastic polymer strands is selected from the group consisting of polyvinyl alcohol (PVA), polyamides, polyacryl amide (PAAm), polymethylmethacrylate (PMMA), polyvinyl carbonate, derivatives thereof, and combinations thereof.

9. The binder solution of any preceding clause, wherein a viscosity of the binder solution is greater than or equal to 1 cP and less than or equal to 40 cP.

10. A method of manufacturing a part, the method comprising: depositing a layer of particulate material on a working surface; selectively applying a binder solution into the layer of particulate material in a pattern representative of a layer of the part, the binder solution comprising: greater than or equal to 0.5 wt % and less than or equal to 40 wt % of a fugitive metal precursor, based on a total weight of the binder solution; a thermoplastic binder comprising one or more thermoplastic polymer strands; and a solvent, wherein the fugitive metal precursor and the thermoplastic binder are dissolved in the solvent; repeating the steps of depositing and selectively applying to form a plurality of layers of particulate material with the applied binder solution; and curing the applied binder solution in the plurality of layers of particulate material with the applied binder solution to evaporate the solvent and thereby form a green body part.

11. The method of any preceding clause, wherein curing the applied binder solution comprises heating the plurality of layers of particulate material with the applied binder solution at a temperature greater than or equal to 40° C. and less than or equal to 80° C.

12. The method of any preceding clause, wherein the fugitive metal precursor comprises a salt selected from the group consisting of carboxylates, nitrates, sulfates, carbonates, formates, chlorides, halides, derivatives thereof, and combinations thereof.

13. The method of any preceding clause, wherein the particulate material comprises a metal particulate material, the metal particulate material comprising a nickel alloy, a cobalt alloy, a cobalt-chromium alloy, a titanium alloy, an aluminum-based material, a tungsten alloy, a stainless steel alloy, or a combination thereof.

14. The method of any preceding clause, wherein the method further comprises: heating the green body part above a first temperature in an oxygen-free environment to remove at least a portion of the thermoplastic binder and sinter at least a portion of the fugitive metal precursor such that the sintered fugitive metal precursor forms necked regions of a metallic material between the particulate material thereby forming a brown body part; and heating the brown body part above a second temperature to sinter the particulate material thereby forming a consolidated part.

15. The method of any preceding clause, wherein the particulate material comprises a ceramic particulate material, the ceramic particulate material comprising alumina, aluminum nitride, zirconia, titania, silica, silicon nitride, silicon carbide, boron nitride, or a combination thereof.

16. A green body part comprising: a plurality of layers of particulate material; greater than or equal to 0.5 wt % and less than or equal to 5 wt % of a fugitive metal precursor, based on a total weight of the green body part; and greater than or equal to 0.5 wt % and less than or equal to 3 wt % of a thermoplastic binder, based on a total weight of the green body part, the thermoplastic binder comprising one or more thermoplastic polymer strands, wherein the thermoplastic binder bonds the particulate material of the plurality of layers or particulate material, and wherein the green body part comprises a three-point flexural strength greater than or equal to 5 MPa as measured in accordance with ASTM B312-14.

17. The green body part of any preceding clause, wherein the fugitive metal precursor comprises a salt selected from the group consisting of carboxylates, nitrates, sulfates, carbonates, formates, chlorides, halides, derivatives thereof, and combinations thereof.

18. The green body part of any preceding clause, wherein the particulate material comprises a metal particulate material, the metal particulate material comprising a nickel alloy, a cobalt alloy, a cobalt-chromium alloy, a titanium alloy, an aluminum-based material, a tungsten alloy, a stainless steel alloy, or a combination thereof.

19. The green body part of any preceding clause, wherein the particulate material comprises a ceramic particulate material, the ceramic particulate material comprising alumina, aluminum nitride, zirconia, titania, silica, silicon nitride, silicon carbide, boron nitride, or a combination thereof.

20. The green body part of any preceding clause, wherein each of the one or more thermoplastic polymer strands is selected from the group consisting of polyvinyl alcohol (PVA), polyamides, polyacryl amide (PAAm), polymethylmethacrylate (PMMA), polyvinyl carbonate, derivatives thereof, and combinations thereof.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A binder solution comprising:
   greater than or equal to 0.5 wt % and less than or equal to 6 wt % of a fugitive metal precursor, based on a total weight of the binder solution;
   a thermoplastic binder comprising a first polymer strand containing a first functional group and a second polymer strand having a second functional group that is different from the first functional group and that complements the first functional group; and
   a solvent, wherein the fugitive metal precursor and the thermoplastic binder are dissolved in the solvent,
   wherein the fugitive metal precursor comprises a salt, the salt comprising nickel chloride, iron chloride, nickel formate, copper chloride, silver perchlorate, silver halide, nickel sulfate, nickel sulfamate, ammonium molybdate tetrahydrate, aluminum nitrate, barium chloride, titanium nitrate, or a combination thereof.

2. The binder solution of claim 1, wherein the binder solution comprises greater than or equal to 1 wt % and less than or equal to 6 wt % of the fugitive metal precursor, based on the total weight of the binder solution.

3. The binder solution of claim 1, wherein the fugitive metal precursor comprises an organometallic compound, the organometallic compound comprising ferrocene, cobaltocene, iron pentacarbonyl, or a combination thereof.

4. The binder solution of claim 1, wherein the first polymer strand has an average molecular weight greater than or equal to 1,000 g/mol and less than or equal to 50,000 g/mol.

5. The binder solution of claim 1, wherein the first polymer strand is selected from the group consisting of polyvinyl alcohol (PVA), polyamides, polyacryl amide (PAAm), polymethylmethacrylate (PMMA), polyvinyl carbonate, derivatives thereof, and combinations thereof.

6. The binder solution of claim 1, wherein a viscosity of the binder solution is greater than or equal to 1 cP and less than or equal to 40 cP.

* * * * *